(12) United States Patent
Matsumoto et al.

(10) Patent No.: US 9,365,673 B2
(45) Date of Patent: Jun. 14, 2016

(54) POLYARYLATE RESIN, AND RESIN SOLUTION AND FILM USING SAME

(71) Applicants: Chiho Matsumoto, Kyoto (JP); Takamasa Akizuki, Kyoto (JP)

(72) Inventors: Chiho Matsumoto, Kyoto (JP); Takamasa Akizuki, Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 14/416,158

(22) PCT Filed: Aug. 2, 2013

(86) PCT No.: PCT/JP2013/070974
§ 371 (c)(1),
(2) Date: Jan. 21, 2015

(87) PCT Pub. No.: WO2014/024787
PCT Pub. Date: Feb. 13, 2014

(65) Prior Publication Data
US 2015/0175742 A1    Jun. 25, 2015

(30) Foreign Application Priority Data

Aug. 10, 2012 (JP) .................................. 2012-178336
Sep. 28, 2012 (JP) .................................. 2012-217111

(51) Int. Cl.
*C08G 63/682* (2006.01)
*H01L 29/08* (2006.01)
*C08J 5/18* (2006.01)
*C08G 63/695* (2006.01)
*C09D 167/00* (2006.01)

(52) U.S. Cl.
CPC .......... *C08G 63/682* (2013.01); *C08G 63/6826* (2013.01); *C08G 63/695* (2013.01); *C08G 63/6956* (2013.01); *C08J 5/18* (2013.01); *C09D 167/00* (2013.01); *C08J 2333/00* (2013.01)

(58) Field of Classification Search
None
See application file for complete search history.

(56) References Cited

U.S. PATENT DOCUMENTS

| 3,824,211 | A | | 7/1974 | Howerton |
| 4,945,147 | A | * | 7/1990 | Policastro ............ C08G 77/445 528/25 |
| 7,790,292 | B2 | | 9/2010 | Colborn et al. |

FOREIGN PATENT DOCUMENTS

| CN | 101528805 | 9/2009 |
| JP | 10-020514 | 1/1998 |
| JP | 2006-290959 | 10/2006 |
| JP | 2009-046667 | 3/2009 |

OTHER PUBLICATIONS

International Search Report in PCT/JP2013/070974.
English language machine translation of JP 2006-290959.
English language machine translation of JP 10-020514.
E-Joon Choi; Synthesis, thermal and radiation sensitivities of fluorine containing methylene-bridged aromatic polyesters; Polymer, 1997, vol. 38, No. 14, pp. 3669 to 3676.
Sheng-Huei Hsiao; Synthesis and Structure-Property Study of Polyarylates Derived from Bisphenols with Different Connector Groups; Journal of Polymer Research; 2005, vol. 12, No. 3, pp. 211 to 218.
E. Bucio; Synthesis and Characterization of New Polyesters Derived from Diphenols and Aromatic Diacids Chlorides; Polymer Bulletin; 2006, vol. 56, No. 2 to 3, pp. 163 to 170.
Extended European Search Report dated Mar. 1, 2016 in corresponding European Application No. 13828101.9.
English language machine translation of JP 2009-046667.

\* cited by examiner

*Primary Examiner* — Susannah Chung
*Assistant Examiner* — Robert T Butcher
(74) *Attorney, Agent, or Firm* — Fildes & Outland, P.C.

(57) ABSTRACT

The polyarylate resin of the present invention includes a bisphenol residue represented by the general formula (1) and an aromatic dicarboxylic acid residue represented by the general formula (2). In formula (1), $R^1$ and $R^2$ each independently represent a hydrocarbon group having 1 to 6 carbon atoms, a halogenated alkyl group or a halogen atom, p and q each independently represent an integer of 0 to 4, and X represents a fluorine atom-containing divalent group. In formula (2), $R^3$ and $R^4$ each independently represent a hydrocarbon group having 1 to 6 carbon atoms, a halogenated alkyl group or a halogen atom, and r and s each independently represent an integer of 0 to 4.

6 Claims, 1 Drawing Sheet

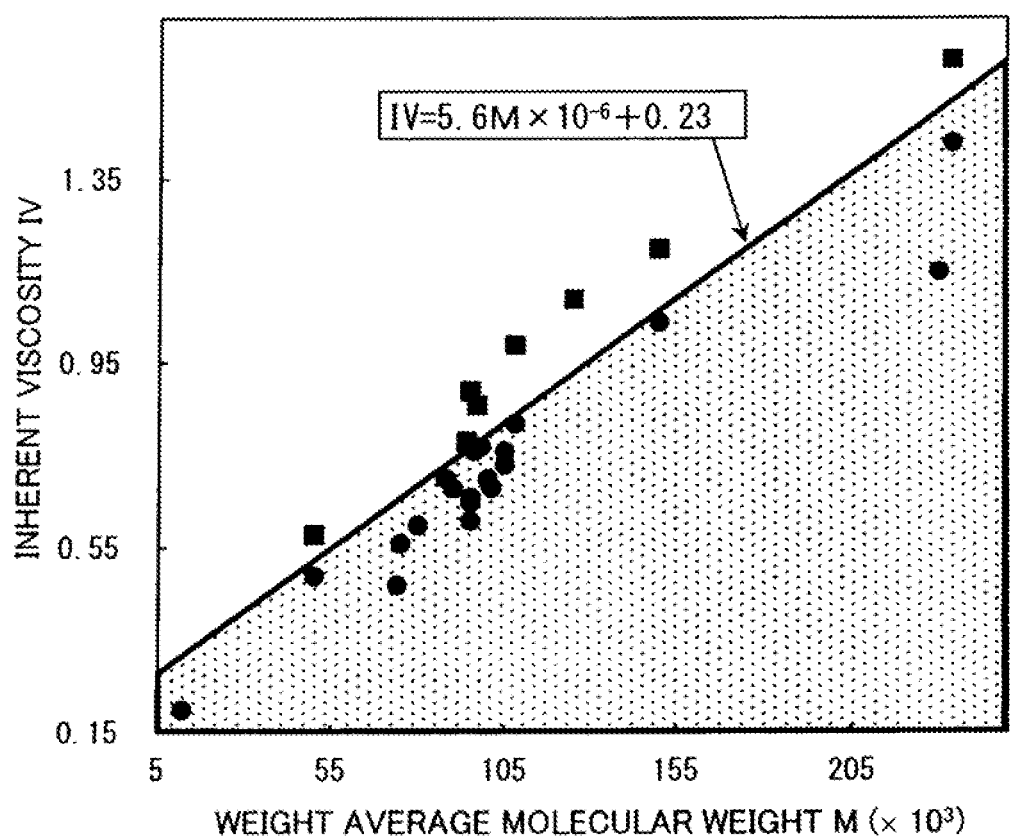

POLYARYLATE RESIN, AND RESIN SOLUTION AND FILM USING SAME

TECHNICAL FIELD

The present invention relates to a polyarylate resin, and a resin solution and a film using the same.

BACKGROUND ART

Polyarylate resins including bisphenol residues and aromatic dicarboxylic acid residues are well known as engineering plastics. In particular, polyarylate resins composed of bisphenol A and terephthalic acid and isophthalic acid are excellent in heat resistance, and hence are widely used as molding resins in the fields of vehicles and in the electric and electronic fields. However, the resins used in the electric and electronic fields are required to be highly flame-retardant from the viewpoint of safety, and polyarylate resin alone is insufficient in flame retardancy.

Polyarylate resins are excellent in the optical transparency in the visible ray region, and hence the application of the polyarylate resins to various optical films and various coating films to be used for, for example, liquid crystal displays has been investigated. However, unfortunately polyarylate resins are yellowed when exposed to ultraviolet ray for a long period of time, and thus the use of polyarylate resins have been restricted.

Moreover, recently in the lamination step of optical films in, for example, liquid crystal displays, ultraviolet ray curing-type adhesives have come to be used in place of conventional solvent-type adhesives from the viewpoint of the improvement of productivity or from environmental consideration. When ultraviolet ray curing-type adhesives are used, the optical films of adherends are required to transmit ultraviolet ray. Accordingly, the polyarylate resins for optical films are required to have high optical transmittance not only in the visible ray region but also in the shorter wavelength region (the ultraviolet ray region of less than 400 nm in wavelength) than the visible ray region. As such a polyarylate resins, for example, there has been used a polyarylate resin using, as the aromatic dicarboxylic acid component, diphenyl ether-4,4'-dicarboxylic acid (Patent Literature 1).

CITATION LIST

Patent Literature

Patent Literature 1: JP2006-290959A

SUMMARY OF INVENTION

Technical Problem

However, as described above, unfortunately polyarylate resins are yellowed when exposed to ultraviolet ray, and the polyarylate resin of Patent Literature 1 has sometimes been yellowed by ultraviolet ray when used for a long period of time as incorporated in, for example, liquid crystal displays of portable terminals. The flame retardancy of polyarylate resins has also been insufficient.

Under such circumstances, an object of the present invention is to provide a polyarylate resin being excellent in heat resistance and in the optical transparency in the visible ray region and in the optical transparency in the shorter wavelength region (ultraviolet ray region) than the visible ray region, and at the same time, having excellent flame retardancy and being suppressed in yellowing due to ultraviolet ray, and to provide a resin solution and a film using the polyarylate resin.

Solution to Problem

The present inventors made a continuous diligent study in order to solve the above-described problems, and consequently have reached the present invention by discovering that a polyarylate resin having a specific bisphenol residue and a specific aromatic dicarboxylic acid residue is excellent in heat resistance and in the optical transparency in the visible ray region and in the optical transparency in the shorter wavelength region (ultraviolet ray region) than the visible ray region, and at the same time, has excellent flame retardancy and is suppressed in yellowing due to ultraviolet ray.

Specifically, the gist of the present invention is as follows.

[1] A polyarylate resin including a bisphenol residue represented by the general formula (1) and an aromatic dicarboxylic acid residue represented by the general formula (2).

[Formula 1]

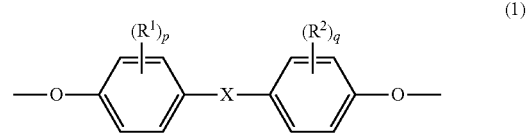

[Formula 2]

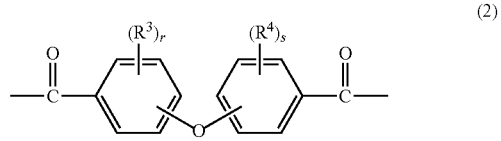

In formula (1), $R^1$ and $R^2$ each independently represent a hydrocarbon group having 1 to 6 carbon atoms, a halogenated alkyl group or a halogen atom, p and q each independently represent an integer of 0 to 4, and X represents a fluorine atom-containing divalent group; in formula (2), $R^3$ and $R^4$ each independently represent a hydrocarbon group having 1 to 6 carbon atoms, a halogenated alkyl group or a halogen atom, and r and s each independently represent an integer of 0 to 4.

[2] The polyarylate resin according to [1], further including an organosiloxane residue represented by the general formula (3).

[Formula 3]

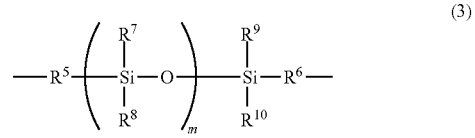

In formula (3), $R^5$ and $R^6$ each independently represent an aliphatic group and/or an aromatic group optionally containing a nitrogen atom or an oxygen atom, $R^7$, $R^8$, $R^9$ and $R^{10}$ each independently represent an aliphatic group or an aromatic group, and m represents an integer of 5 or more.

[3] The polyarylate resin according to [1] or [2], wherein the bisphenol residue represented by the general formula (1) is 2,2-bis(4-hydroxyphenyl)hexafluoropropane residue.

[4] The polyarylate resin according to any one of [1] to [3], wherein the aromatic dicarboxylic acid residue represented by the general formula (2) is diphenyl ether-4,4'-dicarboxylic acid residue.

[5] The polyarylate resin according to any one of [1] to [4], further including an isophthalic acid residue.

[6] The polyarylate resin according to any one of [1] to [5], further including a monohydric phenol residue, a monobasic acid chloride residue, a monohydric alcohol residue and/or a monobasic carboxylic acid residue.

[7] A resin solution prepared by dissolving the polyarylate resin according to any one of [1] to [6] in an organic solvent.

[8] A film prepared by forming a film from the polyarylate resin according to any one of [1] to [6].

[9] The film according to [8], wherein the optical transmittance (400 nm) of the film of 100 μm in thickness, after being irradiated with ultraviolet ray of an illuminance of 1 mW/cm$^2$ for 24 hours retains 70% or more of the optical transmittance (400 nm) of the film before being irradiated with the ultraviolet ray.

Advantageous Effects of Invention

According to the present invention, it is possible to provide a polyarylate resin being excellent in heat resistance and in the optical transparency in the visible ray region and in the optical transparency in the shorter wavelength region (ultraviolet ray region) than the visible ray region, and at the same time, having excellent flame retardancy and being suppressed in yellowing due to ultraviolet ray.

Accordingly, the polyarylate resin of the present invention can be suitably used for the following articles required to have high flame retardancy: electronic devices, liquid crystal displays used outdoors of portable terminals and the like, solar cells, molded components used for lighting fixtures and the like, films, coating materials, substrates of information recording discs, protective films, substrate films of transparent electrically conductive films and the like, optical lenses, binders for electrophotographic photoreceptors, and diaphragms of acoustic equipment.

BRIEF DESCRIPTION OF DRAWING

FIG. 1 is a graph showing the relation between the weight average molecular weights of the polyarylate resins of Examples and Comparative Examples of the present invention and the inherent viscosities of the solutions containing the resins.

DESCRIPTION OF EMBODIMENTS

Hereinafter, the present invention is described in detail.

The present invention relates to a polyarylate resin including a bisphenol residue and an aromatic dicarboxylic acid residue.

The bisphenol residue is required to have the structure represented by the general formula (1).

[Formula 4]

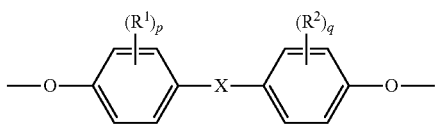

In the general formula (1), X is required to be a fluorine atom-containing divalent group. By designing X in the general formula (1) to be a fluorine atom-containing divalent group, a polyarylate resin is obtained which is excellent in heat resistance and in the optical transparency in the visible ray region and in the optical transparency in the shorter wavelength region (ultraviolet ray region) than the visible ray region, and at the same time, has more excellent flame retardancy than the flame retardancies of conventional polyarylate resins and is suppressed in yellowing due to ultraviolet ray. When X is a divalent group containing no fluorine atom, the flame retardancy is degraded, irradiation with ultraviolet ray causes yellowing, and the optical transmittance is degraded.

The fluorine atom-containing divalent group is represented by, for example, the general formula (1a).

[Formula 5]

In the general formula (1a), $R^{1a}$ and $R^{2a}$ are each independently a trifluoromethyl group ($CF_3$ group), a difluoromethyl group ($CF_2H$ group), a monofluoromethyl group ($CH_2F$ group) or a fluorine atom. Among these, $R^{1a}$ and $R^{2a}$ are each preferably a trifluoromethyl group.

$R^1$ and $R^2$ each represent a substituent bonded to either of the benzene rings in the general formula (1). In the general formula (1), $R^1$ and $R^2$ are each independently a hydrocarbon group having 1 to 6 carbon atoms, a halogenated alkyl group or a halogen atom; this is because in this case, the bisphenol to give the structure represented by the general formula (1) is industrially easily available, or is industrially easily synthesized. Among these, a chlorine atom, a bromine atom, a methyl group, an ethyl group, a phenyl group and a cyclohexyl group are preferable, and a bromine atom and a methyl group are more preferable.

In the general formula (1), p and q represent the numbers of the substituents $R^1$ and $R^2$, respectively, bonded to either of the benzene rings, and are each independently an integer of 0 to 4. For example, when p and q are 0, all the hydrogen atoms bonded to the benzene rings in the general formula (1) are substituted with neither $R^1$ nor $R^2$. When p is 2 to 4, the plurality of R's may be the same substituents as each other, or may be substituents different from each other. When q is 2 to 4, the plurality of $R^{2s}$ may be the same substituents as each other, or may be substituents different from each other. Here, p and q are preferably 0; this is because in this case, the bisphenol to give the structure represented by the general formula (1) is industrially easily available, or is industrially easily synthesized.

Examples of the bisphenol to give the structure represented by the general formula (1) include: 2,2-bis(4-hydroxyphenyl)hexafluoropropane [BisAF], 2,2-bis(3,5-dimethyl-4-hydroxyphenyl)hexafluoropropane, and 2,2-bis(tetramethyl-4-hydroxyphenyl)hexafluoropropane. Among these, BisAF is preferable because of easy industrial availability. When BisAF is used, p=0, q=0 and X=—C(CF$_3$)$_2$— in the general formula (1).

In the present invention, the bisphenol residue may include the residues of the bisphenols other than the bisphenol to give the structure of the general formula (1), within a range not impairing the advantageous effects of the present invention. Examples of the bisphenols to give such residues include: 2,2-bis(4-hydroxyphenyl)propane [BisA], 2,2-bis(3-methyl- 4-hydroxyphenyl)propane [BisC], 9,9-bis(3-methyl-4-hydroxyphenyl)fluorene [BCF], 2,2-bis(3,5-dimethyl-4-hydroxyphenyl)propane, 1,1-bis(4-hydroxyphenyl)-1-phenylethane, 1,1-bis(4-hydroxyphenyl)cyclohexane, 1,1-bis(4-hydroxyphenyl)ethane, 1,1-bis(3,5-dimethyl-4-hydroxyphenyl)ethane, 1,1-bis(3-methyl-4-hydroxyphenyl)ethane, bis(4-hydroxyphenyl)methane, bis(3,5-dimethyl-4-hydroxyphenyl)methane, bis(3-methyl-4-hydroxyphenyl)methane, 1,1-bis(4-hydroxyphenyl)hexane and 1,1-bis(3,5-dimethyl-4-hydroxyphenyl)hexane.

For the purposes of imparting high flame retardancy to the polyarylate resin and more suppressing the yellowing of the polyarylate resin due to ultraviolet ray, the proportion of the bisphenol residue represented by the general formula (1) in the whole bisphenol residues present in the polyarylate resin is preferably 50 to 100 mol %, more preferably 80 to 100 mol % and furthermore preferably 100 mol %.

The aromatic dicarboxylic acid residue is required to have the structure represented by the general formula (2). By having the structure represented by the general formula (1) and at the same time having the structure represented by the general formula (2), excellent heat resistance, excellent flame retardancy, and the optical transparency in the visible ray region and the optical transparency in the shorter wavelength region (ultraviolet ray region) than the visible ray region, and the suppression of the yellowing due to ultraviolet ray can be simultaneously achieved. When the aromatic dicarboxylic acid residue does not have the structure represented by the general formula (2), the optical transparency in the shorter wavelength region (ultraviolet ray region) is degraded, or the polyarylate resin tends to undergo yellowing due to ultraviolet ray. For example, when terephthalic acid to give the structure not represented by the general formula (2) is used alone as the aromatic dicarboxylic acid, the polyarylate resin is degraded in the optical transparency in the shorter wavelength region (ultraviolet ray region) and tends to undergo yellowing due to ultraviolet ray.

[Formula 6]

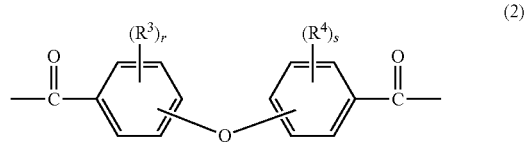

(2)

In formula (2), $R^3$ and $R^4$ each represent a substituent bonded to either of the benzene rings in the general formula (2).

In the general formula (2), $R^3$ and $R^4$ are each independently a hydrocarbon group having 1 to 6 carbon atoms, a halogenated alkyl group or a halogen atom; this is because in this case, the aromatic dicarboxylic acid to give the structure represented by the general formula (2) is industrially easily available, or is industrially easily synthesized. Among these, a chlorine atom, a bromine atom, a methyl group, an ethyl group, a phenyl group and a cyclohexyl group are preferable, and a bromine atom and a methyl group are more preferable.

In the general formula (2), r and s each represent the number of the substituents bonded to either of the benzene rings and are each independently an integer of 0 to 4. For example, when r and s are each 0, all the hydrogen atoms bonded to the benzene rings in the general formula (2) are substituted with neither $R^3$ nor $R^4$. When r is 2 to 4, the plurality of $R^3$s may be the same substituents as each other, or may be substituents different from each other. When s is 2 to 4, the plurality of $R^4$s may be the same substituents as each other, or may be substituents different from each other.

Examples of the aromatic dicarboxylic acid to give the structure represented by the general formula (2) include: diphenyl ether-2,2'-dicarboxylic acid, diphenyl ether-2,3'-dicarboxylic acid, diphenyl ether-2,4'-dicarboxylic acid, diphenyl ether-3,3'-dicarboxylic acid, diphenyl ether-3,4'-dicarboxylic acid and diphenyl ether-4,4'-dicarboxylic acid. Among these, diphenyl ether-4,4'-dicarboxylic acid is preferable because of easy industrial availability. When diphenyl ether-4,4'-dicarboxylic acid is used, r=0 and s=0 in the general formula (2).

In the present invention, the aromatic dicarboxylic acid residue may include the residues of the aromatic dicarboxylic acids other than the aromatic dicarboxylic acid to give the structure of the general formula (2), within a range not impairing the advantageous effects of the present invention. Examples of the aromatic dicarboxylic acids to give such residues include terephthalic acid, isophthalic acid and orthophthalic acid, and isophthalic acid is preferable among these. By using isophthalic acid in combination, the yellowing due to ultraviolet ray can be suppressed.

For the purpose of more suppressing the yellowing due to ultraviolet ray, the proportion of the aromatic dicarboxylic acid residue having the structure represented by the general formula (2) (in the case where an isophthalic acid residue is included, the total proportion of the aromatic dicarboxylic acid residue having the structure represented by the general formula (2) and the isophthalic acid residue) in the whole aromatic dicarboxylic acid residues present in the polyarylate resin is preferably 35 to 100 mol %, more preferably 50 to 100 mol %, furthermore preferably 80 to 100 mol % and most preferably 100 mol %.

From the viewpoint of the tensile elongation at break of the polyarylate resin, the proportion of the aromatic dicarboxylic acid residue having the structure represented by the general formula (2) in the whole aromatic dicarboxylic acid residues present in the polyarylate resin is preferably 35 to 100 mol % and more preferably 100 mol %.

The polyarylate resin of the present invention preferably further includes the organosiloxane residue represented by the general formula (3). The inclusion of the organosiloxane residue represented by the general formula (3) improves the flexibility, the water repellency, the fouling resistance, the surface slippage, the mold release property and the hydrolysis resistance of the polyarylate resin.

[Formula 7]

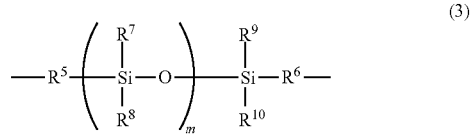

(3)

In the general formula (3), $R^5$ and $R^6$ are each independently an aliphatic group and/or an aromatic group optionally including a nitrogen atom(s) or an oxygen atom(s). $R^5$ and $R^6$ each include, for example, the divalent groups represented by the general formula (4). These divalent groups may be directly bonded to a silicon atom, or alternatively may also be bonded to a silicon atom through the intermediary of an aromatic group and/or an aliphatic group having 1 to 5 carbon atoms.

[Formula 8]

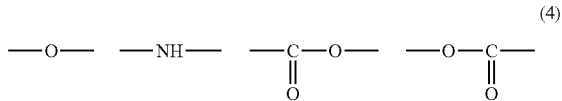

(4)

Because of high versatility, $R^5$ and $R^6$ are each preferably the substituent represented by the general formula (5) or (6). In the general formula (3), the substituent of the general formula (5) or (6) is arranged in such a way that —O— in the general formula (5) or —NH— in the general formula (6) is to be a terminal.

[Formula 9]

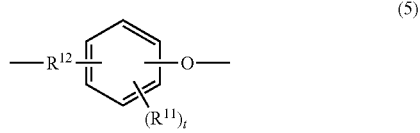

(5)

[Formula 10]

(6)

In the general formula (5), $R^{11}$ is a hydrocarbon group having 1 to 6 carbon atoms, $R^{12}$ is an aliphatic group having 1 to 5 carbon atoms, and t is an integer of 0 to 4.

In the general formula (6), $R^{13}$ is an aliphatic group having 1 to 5 carbon atoms.

In the general formula (3), $R^7$, $R^8$, $R^9$ and $R^{10}$ are each independently an aliphatic group or an aromatic group. Examples of the aromatic groups used in $R^7$, $R^8$, $R^9$ and $R^{10}$ include a phenyl group. The number of the carbon atoms of each of the aliphatic groups used in $R^7$, $R^8$, $R^9$ and $R^{10}$ is, for example, 1 to 6.

In the general formula (3), m represents the number of repetitions of the organosiloxane residue. The organosiloxane is a mixture of the components different in the number of repetitions from each other, and m represents the average value of the mixture. Here, m is required to be a number of 5 or more, and is preferably 10 to 250 and more preferably 20 to 100. When m is a number of 5 or more, an appropriate flexibility can be imparted to the polyarylate resin film while the heat resistance of the polyarylate resin film is being maintained. When m is a number of 250 or less, the viscosity and the solubility of the organosiloxane of such degrees that allow a satisfactory handleability to be obtained are obtained.

When the flexibility of the polyarylate resin is improved, the content of the organosiloxane residue represented by the general formula (3) in the polyarylate resin (the weight proportion of the organosiloxane in the whole resin components used in the synthesis of the polyarylate resin) is preferably 1 to 60% by mass, more preferably 5 to 50% by mass and furthermore preferably 10 to 30% by mass.

The polyarylate resin of the present invention preferably includes terminal groups for sealing the terminals of the molecule thereof. When the terminals of the molecule are sealed, the acid value of the polyarylate resin is reduced, and the polyacrylate is hardly decomposed by light. Because of being capable of making the acid value small, the terminal groups are preferably a monohydric phenol residue, a monobasic acid chloride residue, a monohydric alcohol residue, and/or a monobasic carboxylic acid residue, and are more preferably a monohydric phenol residue and a monohydric alcohol residue.

In the present invention, within a range not impairing the advantageous effects of the present invention, the polyarylate resin may include an aliphatic diol residue, an alicyclic diol residue, an aliphatic dicarboxylic acid residue and an alicyclic dicarboxylic acid residue. Examples of the aliphatic diol include ethylene glycol and propylene glycol. Examples of the alicyclic diol include 1,4-cyclohexanediol, 1,3-cyclohexanediol and 1,2-cyclohexanediol. Examples of the aliphatic dicarboxylic acid include adipic acid and sebacic acid. Examples of the alicyclic dicarboxylic acid include 1,4-cyclohexanedicarboxylic acid, 1,3-cyclohexanedicarboxylic acid and 1,2-cyclohexanedicarboxylic acid.

Examples of the method for producing the polyarylate resin of the present invention include the methods performing reaction in an organic solvent such as an interfacial polymerization and a solution polymerization method, or the method performing reaction in a molten state such as a melt polymerization method. From the viewpoint of polymerizability or the exterior appearance of the obtained resin, it is preferable to use the reaction in an organic solvent, in particular, the interfacial polymerization capable of performing reaction at low temperatures.

Hereinafter, an example of the interfacial polymerization method is described.

To an alkali aqueous solution (aqueous phase) including a bisphenol, a terminal sealing agent and a polymerization catalyst, an organosiloxane solution (organic phase) prepared by dissolving an organosiloxane in an organic solvent and a dibasic carboxylic acid halide solution (organic phase) prepared by dissolving a dibasic carboxylic acid halide are added. Then, the resulting mixture is stirred at a temperature of 50° C. or lower for 1 to 8 hours. Thus, the bisphenol, the dibasic carboxylic acid halide and the organosiloxane are polymerized.

As the organic solvent used in the interfacial polymerization method, a solvent incompatible with water and capable of dissolving the polyarylate resin is preferable. Examples of the organic solvent include methylene chloride and chloroform. Because of being easy to use for the production of the polyarylate resin, the organic solvent is preferably methylene chloride.

Examples of the alkali aqueous solution include a sodium hydroxide aqueous solution and a potassium hydroxide aqueous solution.

The terminal sealing agent is used in order to impart the above-described terminal groups to the terminals of the molecule of the polyarylate resin. The terminal sealing agent is preferably a monohydric phenol, a monobasic acid chloride, a monohydric alcohol or a monobasic carboxylic acid. Examples of the monohydric phenol include: phenol, o-cresol, m-cresol, p-cresol, p-tert-butylphenol [PTBP], o-phenylphenol, m-phenylphenol, p-phenylphenol, o-methoxyphenol, m-methoxyphenol, p-methoxyphenol, 2,3,6-trimethylphenol, 2,3-xylenol, 2,4-xylenol, 2,5-xylenol, 2,6-xylenol, 3,4-xylenol, 3,5-xylenol, 2-phenyl-2-(4-hydroxyphenyl)propane, 2-phenyl-2-(2-hydroxyphenyl)propane and 2-phenyl-2-(3-hydroxyphenyl)propane. Examples of the monobasic acid chloride include: benzoyl chloride, methanesulfonyl chloride and phenyl chloroformate. Examples of the monohydric alcohol include: methanol, ethanol, n-propanol, isopropanol, n-butanol, 2-butanol, pentanol, hexanol, dodecyl alcohol, stearyl alcohol, benzyl alcohol and phenethyl alcohol. Examples of the monobasic carboxylic acid include: acetic acid, propionic acid, octanoic acid, cyclohexanecarboxylic acid, benzoic acid, toluylic acid, phenylacetic acid, p-tert-butylbenzoic acid and p-methoxyphenylacetic acid. Among these, because of being capable of making the acid value small, the terminal sealing agent is preferably a monohydric phenol or a monohydric alcohol. Among these, because of being high in reactivity and thermal stability, the terminal sealing agent is preferably PTBP.

The antioxidant is used in order to prevent the oxidation of the bisphenol component. Examples of the antioxidant include: sodium hydrosulfite, L-ascorbic acid, erythorbic acid, catechin, tocophenol and butylhydroxyanisole. Among these, because of being excellent in water solubility, the antioxidant is preferably sodium hydrosulfite.

Examples of the polymerization catalyst include: quaternary ammonium salts such as tri-n-butylbenzylammonium halide, tetra-n-butylammonium halide, trimethylbenzylammonium halide and triethylbenzylammonium halide; and quaternary phosphonium salts such as tri-n-butylbenzylphosphonium halide; tetra-n-butylphosphonium halide, trimethylbenzylphosphonium halide and triethylbenzylphosphonium halide. Among these, because of being able to yield a polymer having a high molecular weight and a low acid value, the polymerization catalyst is preferably tri-n-butylbenzylammonium halide, trimethylbenzylammonium halide, tetra-n-butylammonium halide, tri-n-butylbenzylphosphonium halide and tetra-n-butylphosphonium halide.

Because of being capable of obtaining high tensile elongation at break, the weight average molecular weight of the polyarylate resin is preferably set at 12000 or more and more preferably set at 50000 or more.

The polyarylate resin preferably has a tensile elongation at break of 10% or more. When the tensile elongation at break is 10% or more, the damage of the film at the time of the production of the film or at the time of the use of the film is drastically suppressed, and a film excellent in practicability can be obtained.

For the purpose of suppressing the degradation of the optical transmittance, the acid value of the polyarylate resin is preferably set at 20 mol/ton or less and more preferably set at 10 mol/ton or less. By using the above-described terminal sealing agents, the acid value of the polyarylate resin can be made small and the decomposition of the polyarylate resin can be suppressed.

The present invention also relates to a film obtained by forming a film from the polyarylate resin.

The film using the polyarylate resin of the present invention can be obtained by, for example, a flow casting method or a melt extrusion method. In the flow casting method, a film is prepared by applying a resin solution prepared by dissolving the polyarylate resin in an organic solvent to a base material, then drying the applied solution to form a coating film, and then releasing the obtained coating film from the base material. In the melt extrusion method, a molten resin is extruded from, for example, a T-die onto a cooling roll and the extruded substance is wound. The flow casting method is preferable because the flow casting method does not cause the color tone degradation due to thermal decomposition, and a colorless transparent film is easily obtained.

Examples of the organic solvent used in the flow casting method include: methylene chloride, 1,2-dichloroethane, chloroform, carbon tetrachloride, chlorobenzene, 1,1,2,2-tetrachloroethane, 1,1,1-trichloroethane, o-dichlorobenzene, m-dichlorobenzene, p-dichlorobenzene, toluene, benzene, xylene and tetrahydrofuran. Among these, because of the easiness in removing the solvent, the organic solvent is preferably methylene chloride or chloroform.

When the polyarylate resin includes the organosiloxane residue represented by the general formula (3), the resin solution prepared by dissolving the polyarylate resin in an organic solvent tends to undergo bubbling, and air bubbles are sometimes mixed into the resin solution. For the purpose of suppressing the mixing of air bubbles in the resin solution, the inherent viscosity (measurement temperature=25° C., concentration=1 g/dL) of the resin solution using 1,1,2,2-tetrachloroethane as the solvent is preferably set at 1.15 or less. When the inherent viscosity (measurement temperature=25° C., concentration=1 g/dL) of the resin solution exceeds 1.15, the air bubbles hardly get out of the resin solution, thus for example, the air bubbles are mixed in the film when a film is prepared, and accordingly sometimes the haze or the surface roughness is increased.

The inherent viscosity of the resin solution is measured by, for example, the following method.

The polyarylate resin is dissolved in an organic solvent to prepare a sample solution having a concentration of n (g/dL). Successively, the falling time t1 of the sample solution and the falling time t2 of the organic solvent are measured by using an Ubbelohde viscometer, at a temperature of 25° C., and the inherent viscosity is determined by using the following formula.

Inherent viscosity=[ln(falling time $t1$ of sample solution/falling time $t2$ of organic solvent)]/concentration $n$(g/dL) of sample solution With the polyarylate resin of the present invention including the bisphenol residue represented by the general formula (1) and the aromatic dicarboxylic acid residue represented by the general formula (2), a resin solution having a lower viscosity is obtained as compared with the viscosity of the solution prepared with a polyarylate resin including a bisphenol A residue having no structure represented by the general formula (1) and an aromatic dicarboxylic acid residue represented by the general formula (2), and having the same weight average molecular weight as the weight average molecular weight of the polyarylate resin of the present invention.

Here, FIG. 1 shows the relation between the weight average molecular weights of the polyarylate resins of below-described Examples and Comparative Examples of the present invention and the inherent viscosities of the solutions containing the resins. In FIG. 1, the plotted circles refer to the cases of the polyarylate resins of Examples, each including a bisphenol residue represented by the general formula (1) and an aromatic dicarboxylic acid residue represented by the general formula (2). In FIG. 1, the plotted squares refer to the cases of the polyarylate resins of Comparative Examples, each including a bisphenol residue having no structure represented by the general formula (1) and an aromatic dicarboxylic acid residue represented by the general formula (2).

As shown in FIG. 1, Examples satisfy the relation, $IV \leq 5.6 \times 10^{-6} \times M + 0.23$ wherein M denotes the weight average molecular weight and IV represents the inherent viscosity. When at one and the same weight average molecular weight M, the polyarylate resin of an Example of the present invention is compared with the conventional polyarylate resin of a Comparative Example, the solution including the polyarylate resin of Example concerned of the present invention is found to have a tendency for the inherent viscosity thereof to be lower as compared with the inherent viscosity of the solution including the conventional polyarylate resin of Comparative Example concerned. Each of the polyarylate resins of the present invention yields a resin solution having a lower inherent viscosity as compared with a conventional polyarylate resin having the same weight average molecular weight as that of the each of the polyarylate resins. Each of the polyarylate resins of the present invention yields a lower solution viscosity without decreasing the molecular weight thereof, and hence is excellent in the solution fluidity within a molecular weight region not impairing the properties of the polyarylate resin and is excellent in application workability.

Examples of the base material used for the flow casting method include: a polyethylene terephthalate (PET) film, a polyimide film, a glass plate and a stainless steel plate. Examples of the application method include, without being particularly limited to: the methods using a wire bar coater, a film applicator, a brush and a spray. Examples of the application method also include: a gravure roll coating method, a screen printing method, a reverse roll coating method, a lip coating method, an air knife coating method, a curtain flow coating method and a dip coating method.

The polyarylate resin of the present invention is excellent in heat resistance, and excellent in the optical transparency in the visible ray region and the optical transparency in the shorter wavelength region (ultraviolet ray region) than the visible ray region, and at the same time, has more excellent flame retardancy than the flame retardancies of conventional polyarylate resins and is suppressed in yellowing due to ultraviolet ray.

Accordingly, the polyarylate resin of the present invention can be suitably used for the following articles required to have high flame retardancy: electronic devices, liquid crystal displays used outdoors of portable terminals and the like, solar cells, molded components used for lighting fixtures and the like, films, coating materials, substrates of information recording discs, protective films, substrate films of transparent electrically conductive films and the like, optical lenses, binders for electrophotographic photoreceptors, and diaphragms of acoustic equipment.

Additionally, in the polyarylate resin including the bisphenol residue represented by the general formula (1), the aromatic dicarboxylic acid residue represented by the general formula (2) and the organosiloxane residue represented by the general formula (3), the flexibility, water repellency, fouling resistance, surface slippage, mold release property and hydrolysis resistance of the polyarylate resin are improved.

Consequently, such a polyarylate resin can be suitably used for substrate films of flexible displays, laminated films, sliding members in motors and the like, water repellent coating agents and release coating agents.

EXAMPLES

Next, Examples of the present invention are specifically described, but the present invention is not limited by these Examples.
<Measurement Methods>
(1) Glass Transition Temperature By using 10 mg of a polyarylate resin as a sample, and a DSC (differential scanning calorimetry) apparatus (DSC7, manufactured by Perkin-Elmer Corp.), the sample was increased in temperature at a temperature increase rate of 10° C./min, and the midpoint temperature between the two inflection point temperatures due to the glass transition in the resulting temperature increase curve was taken as the glass transition temperature. When the glass transition temperature of the polyarylate resin was 150° C. or higher, the polyarylate resin was evaluated to have an excellent heat resistance, and when the glass transition temperature of the polyarylate resin was 180° C. or higher, the polyarylate resin was evaluated to have a further excellent heat resistance.

(2) Weight Average Molecular Weight

By using gel permeation chromatography (GPC), the weight average molecular weight relative to polystyrene standards was measured under the following conditions.

Liquid delivery apparatus: Isocratic HPLC Pump 1515, manufactured by Waters Corp.

Detector: Refractive Index Detector 2414, manufactured by Waters Corp.

Column: Mixed-D (packed silica gel particle size; 5 μm, tube length: 300 mm, inner diameter: 7.5 mm)
Solvent: Chloroform
Flow rate: 1 mL/min
Measurement temperature: 35° C.
(3) Inherent Viscosity A polyarylate resin was dissolved in an organic solvent to prepare a sample solution. As the organic solvent, 1,1,2,2-tetrachloroethane was used. The resin concentration n of the sample solution was regulated to be 1 g/dL. Successively, the falling time t1 of the sample solution and the falling time t2 of the organic solvent were measured by using an Ubbelohde viscometer, at a temperature of 25° C., and the inherent viscosity was determined by using the following formula.

Inherent viscosity=[ln(falling time $t1$ of sample solution/falling time $t2$ of organic solvent)]/resin concentration $n$(g/dL) of sample solution (4) Optical Transmittance A resin solution was obtained by dissolving a polyarylate resin in chloroform in a concentration of 15 to 25% by mass. The resin solution was applied to a PET film with a bar coater by using No. 542-AB Automatic Film Applicator manufactured by Yasuda Seiki Seisakusho Ltd., and then dried at room temperature to form a polyarylate resin film on the PET film. Subsequently, the polyarylate resin film was released from the PET film. The polyarylate film was dried under reduced pressure at 150° C. for 24 hours to yield a film having a thickness of 100 μm.

One surface of the polyarylate resin film was irradiated with an ultraviolet ray of an illuminance of 1 mW/cm$^2$ for 24 hours by using a light box (manufactured by Sunhayato Co., Ltd.) in which three chemical lamps FL10BL (manufactured by Toshiba Lighting & Technology Corp.) were mounted.

The optical transmittances at 350 nm and 400 nm of the polyarylate resin film were measured before and after the ultraviolet ray irradiation according to JIS K0115 by using the spectrophotometer UV-1700 (manufactured by Shimadzu Corp.).

(5) Yellow Index

The yellow indexes of the polyarylate resin films before and after the ultraviolet ray irradiation obtained in (4) were measured according to ASTM D1925, by using the color-difference meter SE6000 manufactured by Nippon Denshoku Industries Co., Ltd. The increment of the yellow index from before irradiation to after irradiation is denoted by ΔYI.

(6) Tensile Elongation at Break and Tensile Modulus of Elasticity

The tensile elongation at break and the tensile modulus of elasticity of the polyarylate resin film before the ultraviolet ray irradiation obtained in (4) were measured according to JIS K7127, by using the Model 2020 (manufactured by Intesco Co., Ltd.).

(7) Flame Retardancy

Strip-shaped molded pieces (specimens) of 0.8 mm in thickness, 125 mm in length and 12 mm in width were prepared by using an injection molding machine (Model EC100N, manufactured by Toshiba Machine Co., Ltd.). The flame retardancy of each of the specimens was evaluated according to the UL94 flame retardancy test specified by Underwriters Laboratories. Specifically, each specimen was held vertically, the flame of a burner was brought into contact with the specimen twice in 10 seconds, and thus the afterflame time was measured twice for one specimen. For each of Examples and Comparative Examples, five specimens were prepared and the afterflame time was measured 10 times. The occurrence/nonoccurrence of the ignition of cotton by drip was also examined. The case where the flame contact caused at least one specimen of the five specimens to undergo the ignition of cotton by drip was evaluated to involve the occurrence of the ignition of cotton. Moreover, the occurrence/nonoccurrence of the burnout of each of the specimens was examined. The case where the burnout of at least one specimen of the five specimens occurred was evaluated to involve the occurrence of the burnout. On the basis of these evaluation results, the specimens of respective Examples and Comparative Examples were classified into the three levels shown in Table 1.

The level of the V-1 level or higher was evaluated as practically sufficiently usable level, and the polyarylate resin attaining such a level was evaluated to have excellent flame retardancy. The V-0 level indicates a level more excellent in flame retardancy as compared with the V-1 level.

TABLE 1

|  | V-0 | V-1 | V-2 |
| --- | --- | --- | --- |
| Afterflame time in one run | 10 seconds or less | 30 seconds or less | 30 seconds or less |
| Total afterflame time of five specimens (10 runs in total) | 50 seconds or less | 250 seconds or less | 250 seconds or less |
| Occurrence/nonoccurrence of ignition of cotton by drip | Not occurred | Not occurred | Occurred |
| Burnout of sample | Not occurred | Not occurred | Not occurred |

(8) Acid Value

In 20 mL of methylene chloride, 300 mg of a polyarylate resin was dissolved under heating to yield a sample solution. The sample solution was titrated with a 0.1 N benzyl alcohol solution of potassium hydroxide by using phenol red as the indicator. On the basis of the result obtained from the titration, the number of equivalents contained in 1 ton of the polyarylate resin was calculated as the acid value.

(9) Evaluation of Bubbling

In a glass bottle, 5 g of a polyarylate resin and 45 g of chloroform were placed, and stirred at 80 rpm by using a wave rotor for 12 hours to yield a resin solution. The presence/absence of air bubbles in the resin solution after being allowed to stand still for 1 hour was visually examined.

(10) Relative Numbers of Moles in Composition

In 1 mL of heavy chloroform, 30 mg of a polyarylate resin was dissolved, and the $^1$H-NMR spectrum of the resulting solution was measured by using the nuclear magnetic resonance spectrometer ECA500 manufactured by JEOL Ltd., and the relative numbers of moles in the composition of the resin were calculated.

Example 1

In a reaction vessel equipped with a stirring apparatus, 100 parts by mass of 2,2-bis(4-hydroxyphenyl)hexafluoropropane [BisAF] as a bisphenol component, 1.34 parts by mass of p-tert-butylphenol [PTBP] as a terminal sealing agent, 25.4 parts by mass of sodium hydroxide [NaOH] as an alkali, 1.28 parts by mass of a 50% by mass aqueous solution of tri-n-butylbenzylammonium chloride [TBBAC] as a polymerization catalyst, and 0.5 part by mass of sodium hydrosulfite as an antioxidant were dissolved in 1750 parts by mass of water (aqueous phase).

Apart from this, 89.1 parts by mass of diphenyl ether-4,4'-dicarboxylic acid chloride [DEDC] as an aromatic dicarboxylic acid component was dissolved in 1200 parts by mass of methylene chloride (organic phase).

The aqueous phase was beforehand stirred, then the organic phase was added to the aqueous phase under strong stirring, and thus the resulting mixture was allowed to undergo the interfacial polymerization reaction at 15° C. for 2 hours. The molar ratio was regulated to be BisAF:DEDC:PTBP:TBBAC:NaOH=98.5:100.0:3.0:0.68:210.

Subsequently, the stirring was terminated, and the aqueous phase and the organic phase were separated from each other by performing decantation. After removing the aqueous phase, 500 parts by mass of methylene chloride, 2000 parts by mass of pure water and 2 parts by mass of acetic acid were added to the organic phase to terminate the reaction, and the resulting mixture was stirred at 15° C. for 30 minutes. Then, the organic phase was washed with pure water 10 times, and the organic phase was added in methanol to precipitate the resulting polymer. The precipitated polymer was filtered off and dried to yield a polyarylate resin.

Examples 2 to 5

In each of Examples 2 to 5, a polyarylate resin was obtained in the same manner as in Example 1 except that BisAF and PTBP were mixed so as for the relative numbers of moles of BisAF and PTBP to be the values shown in Table 2.

Examples 6 and 7

In each of Examples 6 and 7, a polyarylate resin was obtained in the same manner as in Example 1 except that BisAF and 2,2-bis(4-hydroxyphenyl)propane [BisA] were mixed as the bisphenol components so as for the relative numbers of moles of BisAF and BisA to be the values shown in Table 2.

Examples 8 to 12

In each of Examples 8 to 12, a polyarylate resin was obtained in the same manner as in Example 1 except that DEDC and isophthalic acid chloride [IPC] or terephthalic acid chloride [TPC] were mixed as aromatic dicarboxylic acid components so as for the relative numbers of moles of DEDC and IPC or TPC to be the values shown in Table 2.

Example 13

In a reaction vessel equipped with a stirring apparatus, 100 parts by mass of BisAF as a bisphenol component, 1.79 parts by mass of PTBP as a terminal sealing agent, 25.5 parts by mass of NaOH as an alkali, 1.29 parts by mass of a 50% by mass aqueous solution of TBBAC as a polymerization catalyst, and 0.5 part by mass of sodium hydrosulfite as an antioxidant were dissolved in 1750 parts by mass of water (aqueous phase).

Apart from this, in 500 parts by mass of methylene chloride, 0.17 part by mass of the organosiloxane (m=40) represented by the following formula (7) was dissolved (organic phase 1).

[Formula 11]

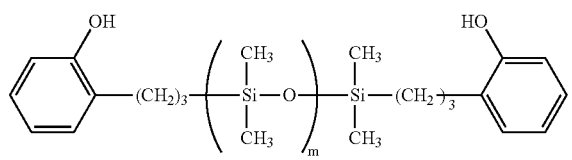

(7)

The organic phase 1 was added in the previously prepared aqueous phase under strong stirring. Apart from the organic phase 1, 89.5 parts by mass of DEDC was dissolved in 700 parts by mass of methylene chloride (organic phase 2).

The organic phase 2 was added in the mixed solution composed of the aqueous phase and the organic phase 1, and thus the resulting mixture was allowed to undergo the interfacial polymerization reaction at 15° C. for 2 hours. The molar ratio was regulated to be BisAF:DEDC:organosiloxane:PTBP:TBBAC:NaOH=98.0:100.0:0.02:3.9:0.68:210.

A polyarylate resin was obtained in the same manner as in Example 1 except for what was described above.

The content of the organosiloxane residue in the polyarylate resin was found to be 0.1% by mass.

Example 14

A polyarylate resin was obtained in the same manner as in Example 13 except that the materials were mixed so as for the molar ratio to be BisAF:DEDC:organosiloxane:PTBP:TBBAC:NaOH=97.9:100.0:0.17:3.9:0.68:210.

The content of the organosiloxane residue in the polyarylate resin was found to be 1% by mass.

Example 15

A polyarylate resin was obtained in the same manner as in Example 13 except that the materials were mixed so as for the molar ratio to be BisAF:DEDC:organosiloxane:PTBP:TBBAC:NaOH 97.2:100.0:0.9:3.9:0.68:210.

The content of the organosiloxane residue in the polyarylate resin was found to be 5% by mass.

Example 16

A polyarylate resin was obtained in the same manner as in Example 13 except that the materials were mixed so as for the molar ratio to be BisAF:DEDC:organosiloxane:PTBP:TBBAC:NaOH=93.9:100.0:4.2:3.9:0.68:210.

The content of the organosiloxane residue in the polyarylate resin was found to be 20% by mass.

Example 17

A polyarylate resin was obtained in the same manner as in Example 13 except that the materials were mixed so as for the molar ratio to be BisAF:DEDC:organosiloxane:PTBP:TBBAC:NaOH=95.4:100.0:4.1:1.0:0.68:210.

The content of the organosiloxane residue in the polyarylate resin was found to be 20% by mass.

Example 18

A polyarylate resin was obtained in the same manner as in Example 13 except that the materials were mixed so as for the molar ratio to be BisAF:DEDC:organosiloxane:PTBP:TBBAC:NaOH=95.6:100.0:4.1:0.5:0.68:210.

The content of the organosiloxane residue in the polyarylate resin was found to be 20% by mass.

Example 19

A polyarylate resin was obtained in the same manner as in Example 13 except that the materials were mixed so as for the molar ratio to be BisAF:DEDC:organosiloxane:PTBP:TBBAC:NaOH=74.2:100.0:22.9:5.8:0.68:210.

The content of the organosiloxane residue in the polyarylate resin was found to be 60% by mass.

Example 20

A polyarylate resin was obtained in the same manner as in Example 13 except that the organosiloxane (m=10) represented by the foregoing formula (7) was used, and the materials were mixed so as for the molar ratio to be BisAF:DEDC:organosiloxane:PTBP:TBBAC:NaOH=85.9:100.0:12.2:3.9:0.68:210.

The content of the organosiloxane residue in the polyarylate resin was found to be 20% by mass.

Example 21

A polyarylate resin was obtained in the same manner as in Example 13 except that the organosiloxane (m=2) represented by the foregoing formula (7) was used, and the materials were mixed so as for the molar ratio to be BisAF:DEDC:organosiloxane:PTBP:TBBAC:NaOH=73.0:100.0:25.0:3.9:0.68:210.

The content of the organosiloxane residue in the polyarylate resin was found to be 20% by mass.

Comparative Examples 1 to 4

In each of Comparative Examples 1 to 4, a polyarylate resin was obtained in the same manner as in Example 1 except that 2,2-bis(4-hydroxyphenyl)propane [BisA] was used in place of BisAF, and BisA and PTBP were mixed so as for the relative numbers of moles of BisA and PTBP to be the values shown in Table 2.

Comparative Example 5

A polyarylate resin was obtained in the same manner as in Comparative Example 1 except that DEDC and IPC were used as aromatic dicarboxylic acid components, and the materials were mixed so as for the molar ratio to be BisA:DEDC:IPC:PTBP:TBBAC:NaOH=98.5:30.0:70.0:3.0:0.68:210.

Comparative Examples 6 and 7

In each of Comparative Examples 6 and 7, a polyarylate resin was obtained in the same manner as in Comparative Example 1 except that 2,2-bis(3-methyl-4-hydroxyphenyl)propane [BisC] or 9,9-bis(3-methyl-4-hydroxyphenyl)fluorene [BCF] was used in place of BisA, and BisC or BCF and PTBP were mixed so as for the relative numbers of moles of BisC or BCF and PTBP to be the values shown in Table 2.

Comparative Example 8

A polyarylate resin was obtained in the same manner as in Example 13 except that BisA was used in place of BisAF, and the materials were mixed so as for the molar ratio to be BisA:DEDC:organosiloxane:PTBP:TBBAC:NaOH=94.7:100.0:3.4:3.9:0.68:210.

Comparative Example 9

A polyarylate resin was obtained in the same manner as in Example 1 except that only TPC was used as an aromatic dicarboxylic acid component in place of DEDC, and the materials were mixed so as for the molar ratio to be BisAF:TPC:PTBP:TBBAC:NaOH=98.5:100.0:3.0:0.68:210.

In each of Examples and Comparative Examples, the relative numbers of moles in the composition of the obtained polyarylate resin were the same as the relative numbers of moles of the starting materials.

The evaluation results are shown in Tables 2 and 3.

TABLE 2

| | Resin composition | | | | | | | | | | | |
|---|---|---|---|---|---|---|---|---|---|---|---|---|
| | Aromatic dicarboxylic acid chloride | | Bisphenol | | Organosiloxane | | | | Terminal sealing agent | | Glass transition temperature °C | Weight average molecular weight ×10³ | Inherent viscosity |
| | Type | Relative number of moles | Type | Relative number of moles | Type | m in formula (7) | Relative number of moles | % by mass | Type | Relative number of moles | | | |
| Example 1 | DEDC | 100.0 | BisAF | 98.5 | — | | | — | PTBP | 3.0 | 221 | 108 | 0.82 |
| Example 2 | DEDC | 100.0 | BisAF | 99.5 | — | | | — | PTBP | 1.0 | 224 | 234 | 1.43 |
| Example 3 | DEDC | 100.0 | BisAF | 99.0 | — | | | — | PTBP | 2.0 | 222 | 150 | 1.04 |
| Example 4 | DEDC | 100.0 | BisAF | 96.6 | — | | | — | PTBP | 6.8 | 215 | 50 | 0.49 |
| Example 5 | DEDC | 100.0 | BisAF | 90.9 | — | | | — | PTBP | 18.2 | 195 | 12 | 0.20 |
| Example 6 | DEDC | 100.0 | BisAF / BisA | 78.8 / 19.7 | — | | | — | PTBP | 3.0 | 215 | 98 | 0.77 |
| Example 7 | DEDC | 100.0 | BisAF / BisA | 69.0 / 29.5 | — | | | — | PTBP | 3.0 | 212 | 96 | 0.76 |
| Example 8 | DEDC / IPC | 70.0 / 30.0 | BisAF | 98.5 | — | | | — | PTBP | 3.0 | 220 | 105 | 0.76 |
| Example 9 | DEDC / IPC | 50.0 / 50.0 | BisAF | 98.5 | — | | | — | PTBP | 3.0 | 218 | 100 | 0.70 |
| Example 10 | DEDC / IPC | 35.0 / 65.0 | BisAF | 98.5 | — | | | — | PTBP | 3.0 | 210 | 95 | 0.65 |
| Example 11 | DEDC / IPC | 30.0 / 70.0 | BisAF | 98.5 | — | | | — | PTBP | 3.0 | 208 | 95 | 0.61 |
| Example 12 | DEDC / TPC | 50.0 / 50.0 | BisAF | 98.5 | — | | | — | PTBP | 3.0 | 225 | 105 | 0.73 |
| Example 13 | DEDC | 100.0 | BisAF | 98.0 | ORGS | 40 | 0.02 | 0.1 | PTBP | 3.9 | 215 | 88 | 0.70 |
| Example 14 | DEDC | 100.0 | BisAF | 97.9 | ORGS | 40 | 0.17 | 1 | PTBP | 3.9 | 210 | 90 | 0.68 |
| Example 15 | DEDC | 100.0 | BisAF | 97.2 | ORGS | 40 | 0.9 | 5 | PTBP | 3.9 | 202 | 95 | 0.66 |
| Example 16 | DEDC | 100.0 | BisAF | 93.9 | ORGS | 40 | 4.2 | 20 | PTBP | 3.9 | 182 | 101 | 0.68 |
| Example 17 | DEDC | 100.0 | BisAF | 95.4 | ORGS | 40 | 4.1 | 20 | PTBP | 1.0 | 183 | 230 | 1.15 |
| Example 18 | DEDC | 100.0 | BisAF | 95.6 | ORGS | 40 | 4.1 | 20 | PTBP | 0.5 | 183 | 293 | 1.33 |
| Example 19 | DEDC | 100.0 | BisAF | 74.2 | ORGS | 40 | 22.9 | 60 | PTBP | 5.8 | — | 74 | 0.47 |
| Example 20 | DEDC | 100.0 | BisAF | 85.9 | ORGS | 10 | 12.2 | 20 | PTBP | 3.9 | 180 | 80 | 0.60 |
| Example 21 | DEDC | 100.0 | BisAF | 73.0 | ORGS | 2 | 25.0 | 20 | PTBP | 3.9 | 160 | 75 | 0.56 |

TABLE 2-continued

| | Acid value mol/t | Optical transmittance [measured in ultraviolet ray region (350 nm)] % | Optical transmittance [measured in visible ray region (400 nm)] Initial % | Optical transmittance [measured in visible ray region (400 nm)] After UV irradiation % | Optical transmittance [measured in visible ray region (400 nm)] Retention rate % | Yellow index Initial | Yellow index After UV irradiation | ΔYI | Tensile elongation at break % | Tensile modulus of elasticity GPa | Flame retardancy UL94V | Air bubbles |
|---|---|---|---|---|---|---|---|---|---|---|---|---|
| Example 1 | 3 | 84 | 87 | 81 | 93 | 1 | 2 | 1 | 84 | 1.6 | V-0 | Not occurred |
| Example 2 | 2 | 84 | 87 | 81 | 93 | 1 | 2 | 1 | 87 | 1.6 | V-0 | Not occurred |
| Example 3 | 2 | 84 | 87 | 80 | 92 | 1 | 2 | 1 | 85 | 1.6 | V-0 | Not occurred |
| Example 4 | 4 | 84 | 87 | 80 | 92 | 1 | 2 | 1 | 65 | 1.5 | V-0 | Not occurred |
| Example 5 | 10 | 84 | 87 | 81 | 93 | 1 | 2 | 1 | 10 | 1.5 | V-0 | Not occurred |
| Example 6 | 3 | 82 | 87 | 70 | 80 | 1 | 3 | 2 | 80 | 1.6 | V-0 | Not occurred |
| Example 7 | 3 | 82 | 87 | 67 | 77 | 1 | 4 | 3 | 82 | 1.6 | V-1 | Not occurred |
| Example 8 | 4 | 84 | 87 | 81 | 94 | 1 | 2 | 1 | 82 | 1.6 | V-0 | Not occurred |
| Example 9 | 4 | 85 | 87 | 81 | 93 | 1 | 2 | 1 | 80 | 1.7 | V-0 | Not occurred |
| Example 10 | 5 | 85 | 87 | 82 | 93 | 1 | 2 | 1 | 79 | 1.7 | V-0 | Not occurred |
| Example 11 | 6 | 86 | 88 | 84 | 95 | 1 | 2 | 1 | 68 | 1.7 | V-0 | Not occurred |
| Example 12 | 4 | 80 | 87 | 61 | 70 | 1 | 4 | 3 | 78 | 1.7 | V-0 | Not occurred |
| Example 13 | 2 | 84 | 87 | 81 | 94 | 1 | 2 | 1 | 82 | 1.6 | V-0 | Not occurred |
| Example 14 | 3 | 84 | 87 | 80 | 92 | 1 | 2 | 1 | 84 | 1.4 | V-0 | Not occurred |
| Example 15 | 2 | 83 | 87 | 80 | 92 | 1 | 2 | 1 | 84 | 1.4 | V-0 | Not occurred |
| Example 16 | 2 | 83 | 87 | 81 | 94 | 1 | 2 | 1 | 87 | 1.0 | V-0 | Not occurred |
| Example 17 | 3 | 83 | 87 | 80 | 92 | 1 | 2 | 1 | 88 | 1.0 | V-0 | Not occurred |
| Example 18 | 2 | 83 | 87 | 80 | 92 | 1 | 2 | 1 | 88 | 1.0 | V-0 | Not occurred |
| Example 19 | 2 | 83 | 87 | 81 | 94 | 1 | 2 | 1 | 120 | 0.3 | V-0 | Occurred |
| Example 20 | 3 | 83 | 87 | 81 | 94 | 1 | 2 | 1 | 84 | 1.4 | V-0 | Not occurred |
| Example 21 | 3 | 83 | 87 | 80 | 92 | 1 | 2 | 1 | 82 | 1.6 | V-0 | Not occurred |

DEDC: diphenyl ether-4,4'-dicarboxylic acid chloride,
IPC: isophthalic acid chloride,
TPC: terephthalic acid chloride,
BisAF: 2,2-bis(4-hydroxyphenyl)hexafluoropropane,
BisA: 2,2-bis(4-hydroxyphenyl)propane,
BisC: 2,2-bis(3-methyl-4-hydroxyphenyl)propane,
BCF: 9,9-bis(3-methyl-4-hydroxyphenyl)fluorene,
ORGS: organosiloxane represented by formula (7),
PTBP: p-tert-bytylphenol;
the content of the organosiloxane in % by mass is based on 100% by mass of the whole resin composition.

TABLE 3

| | Resin composition | | | | | | | | | | | |
|---|---|---|---|---|---|---|---|---|---|---|---|---|
| | Aromatic dicarboxylic acid chloride | | Bisphenol | | Organosiloxane | | | | Terminal sealing agent | | Glass transition temperature °C. | Weight average molecular weight ×10³ | Inherent viscosity |
| | Type | Relative number of moles | Type | Relative number of moles | Type | m in formula (7) | Relative number of moles | % by mass | Type | Relative number of moles | | | |
| Comparative Example 1 | DEDC | 100.0 | BisA | 98.8 | — | | — | — | PTBP | 2.5 | 209 | 108 | 0.99 |
| Comparative Example 2 | DEDC | 100.0 | BisA | 98.8 | — | | — | — | PTBP | 0.5 | 212 | 234 | 1.61 |
| Comparative Example 3 | DEDC | 100.0 | BisA | 99.4 | — | | — | — | PTBP | 1.2 | 210 | 150 | 1.20 |
| Comparative Example 4 | DEDC | 100.0 | BisA | 97.1 | — | | — | — | PTBP | 5.8 | 193 | 50 | 0.58 |
| Comparative Example 5 | DEDC IPC | 30.0 70.0 | BisA | 98.5 | — | | — | — | PTBP | 3.0 | 202 | 95 | 0.89 |
| Comparative Example 6 | DEDC | 100.0 | BisC | 98.8 | — | | — | — | PTBP | 2.5 | 192 | 125 | 1.09 |
| Comparative Example 7 | DEDC | 100.0 | BCF | 98.5 | — | | — | — | PTBP | 3.0 | 290 | 97 | 0.86 |
| Comparative Example 8 | DEDC | 100.0 | BisA | 94.7 | ORGS | 40 | 34 | 20 | PTBP | 3.9 | 173 | 94 | 0.78 |
| Comparative Example 9 | TPC | 100.0 | BisAF | 98.5 | — | | — | — | PTBP | 3.0 | 227 | 110 | 0.70 |

| | Acid value mol/t | Optical transmittance [measured in ultraviolet ray region (350 nm)] % | Optical transmittance [measured in visible ray region (400 nm)] | | | Yellow index | | | Tensile elongation at break % | Tensile modulus of elasticity GPa | Flame retardancy UL94V | Air bubbles |
|---|---|---|---|---|---|---|---|---|---|---|---|---|
| | | | Initial % | After UV irradiation % | Retention rate % | Initial | After UV irradiation | ΔYI | | | | |
| Comparative Example 1 | 3 | 79 | 84 | 45 | 54 | 2 | 7 | 5 | 75 | 1.7 | V-2 | Not occurred |
| Comparative Example 2 | 3 | 79 | 84 | 45 | 54 | 2 | 7 | 5 | 79 | 1.7 | V-2 | Not occurred |
| Comparative Example 3 | 2 | 79 | 84 | 46 | 55 | 2 | 7 | 5 | 76 | 1.7 | V-2 | Not occurred |
| Comparative Example 4 | 2 | 79 | 84 | 44 | 52 | 2 | 7 | 5 | 60 | 1.6 | V-2 | Not occurred |
| Comparative Example 5 | 5 | 80 | 85 | 47 | 55 | 2 | 6 | 4 | 70 | 1.8 | V-2 | Not occurred |
| Comparative Example 6 | 2 | 80 | 85 | 34 | 41 | 2 | 8 | 6 | 30 | 1.8 | V-2 | Not occurred |
| Comparative Example 7 | 4 | 67 | 82 | 43 | 53 | 2 | 7 | 5 | 22 | 1.8 | V-2 | Not occurred |
| Comparative Example 8 | 3 | 79 | 85 | 43 | 51 | 2 | 7 | 5 | 80 | 1.2 | V-2 | Not occurred |
| Comparative Example 9 | 6 | 75 | 86 | 45 | 52 | 2 | 7 | 5 | 34 | 1.8 | V-0 | Not occurred |

DEDC: diphenyl ether-4,4'-dicarboxylic acid chloride,
IPC: isophthalic acid chloride,
TPC: terephthalic acid chloride,
BisAF: 2,2-bis(4-hydroxyphenyl)hexafluoropropane,
BisA: 2,2-bis(4-hydroxyphenyl)propane,
BisC: 2,2-bis(3-methyl-4-hydroxyphenyl)propane,
BCF: 9,9-bis(3-methyl-4-hydroxyphenyl)fluorene.
ORGS: organosiloxane represented by formula (7),
PTBP: p-tert-bytylphenol;
the content of the organosiloxane in % by mass is based on 100% by mass of the whole resin composition.

In each of Examples 1 to 21, the polyarylate resin includes the bisphenol residue represented by the general formula (1) and the aromatic dicarboxylic acid residue represented by the general formula (2), and hence the retention rate of the optical transmittance in the visible ray region was higher and ΔYI was smaller as compared with those of Comparative Examples 1 to 9. In each of Examples 1 to 21, the glass transition temperature was 150° C. or higher, the heat resistance was higher, and the optical transmittance in the ultraviolet ray region was also higher. Moreover, in each of Examples 1 to 21, the flame retardancy evaluation gave the result of V-0 or V-1, to yield high flame retardancy.

In any one of Examples 14 to 20, in each of which the content of the organosiloxane residue represented by the general formula (3) was 1 to 60% by mass, the tensile modulus of elasticity was small and high flexibility was obtained. In Example 21, in which the value of m in the general formula (3) is less than 5, the reduction effect of the tensile modulus of elasticity became small.

A mutual comparison of Examples 13 to 21, each including the organosiloxane residue represented by the general formula (3), revealed that no air bubbles occurred in the resin solution in any one of Examples 13 to 17 and 19 to 21, each having the inherent viscosity of the resin solution of 1.15 or less, but air bubbles occurred in the resin solution in Example 18 having the inherent viscosity of the resin solution exceeding 1.15.

When the resins of Examples 1 to 4 and 11 were compared respectively with the resins of Comparative Examples 1 to 5 wherein the resins of Examples 1 to 4 and 11 were respectively approximately the same in the weight average molecular weight as the resins of Comparative Examples 1 to 5, the solutions including the polyarylate resins of Examples 1 to 4 and 11 respectively exhibited lower inherent viscosities as compared with the inherent viscosities of the solutions including the resins of Comparative Examples 1 to 5.

In Example 9 using DEDC and IPC in combination as the aromatic dicarboxylic acids, as compared with Example 12 using DEDC and TPC in combination as the aromatic dicarboxylic acids, the retention rate of the optical transmittance in the visible ray region was higher, and ΔYI was smaller.

The resins of Comparative Examples 1 to 8 did not include the bisphenol residue represented by the general formula (1), and hence in each of these resins, ΔYI was large, the retention rate of the optical transmittance in the visible ray region was low, and the flame retardancy was also low.

In the resin of Comparative Example 9 using only TPC as the aromatic dicarboxylic acid component, ΔYI was large and the retention rate of the optical transmittance in the visible ray region was low.

The invention claimed is:

1. A polyarylate resin comprising a bisphenol residue and an aromatic dicarboxylic acid residue, wherein
the bisphenol residue is 2,2-bis(4-hydroxyphenyl) hexafluoropropane residue, the aromatic dicarboxylic acid residue is diphenyl ether-4,4'-dicarboxylic acid residue and an isophthalic acid residue, and a molar ratio (diphenyl ether-4,4'-dicarboxylic acid residue/isophthalic acid residue) is 70/30 to 35/65.

2. The polyarylate resin according to claim 1, further comprising an organosiloxane residue represented by the general formula (3):

[Formula 3]

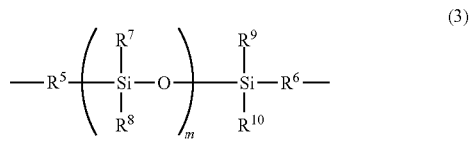

(3)

wherein, in formula (3), $R^5$ and $R^6$ each independently represent an aliphatic group and/or an aromatic group optionally containing a nitrogen atom or an oxygen atom, $R^7$, $R^8$, $R^9$ and $R^{10}$ each independently represent an aliphatic group or an aromatic group, and m represents an integer of 5 or more.

3. The polyarylate resin according to claim 1, further comprising a monohydric phenol residue, a monobasic acid chloride residue, a monohydric alcohol residue and/or a monobasic carboxylic acid residue.

4. A resin solution prepared by dissolving the polyarylate resin according to claim 1 in an organic solvent.

5. A film prepared by forming a film from the polyarylate resin according to claim 1.

6. The film according to claim 5, wherein an optical transmittance (400 nm) of the film of 100 μm in thickness, after being irradiated with ultraviolet ray of an illuminance of 1 mW/cm² for 24 hours retains 70% or more of the optical transmittance (400 nm) of the film before being irradiated with the ultraviolet ray.

* * * * *